(12) United States Patent
Delpech

(10) Patent No.: US 11,621,002 B2
(45) Date of Patent: Apr. 4, 2023

(54) METHOD AND DEVICE FOR AUTOMATICALLY MANAGING AUDIO AIR TRAFFIC CONTROL MESSAGES ON BOARD AN AIRCRAFT

(71) Applicant: Airbus Operations SAS, Toulouse (FR)

(72) Inventor: Estelle Delpech, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 373 days.

(21) Appl. No.: 16/880,164

(22) Filed: May 21, 2020

(65) Prior Publication Data

US 2020/0372916 A1    Nov. 26, 2020

(30) Foreign Application Priority Data

May 23, 2019   (FR) ...................................... 1905405

(51) Int. Cl.

| | |
|---|---|
| *G10L 15/26* | (2006.01) |
| *G10L 15/22* | (2006.01) |
| *G10L 25/51* | (2013.01) |
| G10L 15/18 | (2013.01) |
| G10L 15/08 | (2006.01) |
| G10L 15/183 | (2013.01) |
| G10L 15/19 | (2013.01) |

(52) U.S. Cl.
CPC .............. *G10L 15/26* (2013.01); *G10L 15/22* (2013.01); *G10L 25/51* (2013.01); *G10L 15/183* (2013.01); *G10L 15/1815* (2013.01); *G10L 15/1822* (2013.01); *G10L 15/19* (2013.01); *G10L 2015/088* (2013.01)

(58) Field of Classification Search
None
See application file for complete search history.

(56) References Cited

U.S. PATENT DOCUMENTS

| | | | |
|---|---|---|---|
| 7,580,377 B2 * | 8/2009 | Judd | ....................... G10L 15/26 340/963 |
| 8,515,763 B2 * | 8/2013 | Dong | ...................... G10L 15/22 701/14 |

(Continued)

FOREIGN PATENT DOCUMENTS

| | | |
|---|---|---|
| FR | 3010809 A1 | 3/2015 |
| FR | 3056321 A1 | 3/2018 |

OTHER PUBLICATIONS

French Search Report; priority document.

*Primary Examiner* — Richard Z Zhu
(74) *Attorney, Agent, or Firm* — Greer, Burns & Crain, Ltd

(57) ABSTRACT

A device comprises a transcription unit for transcribing an audio message received from the air traffic control into a text message, a processing unit for extracting first indications from the text message, a transcription unit for transcribing, into a restated text message, a restated audio message transmitted by the pilot to the air traffic control after the reception of the audio message, a processing unit for extracting second indications from the restated text message, a comparison unit for comparing the first and second indications and a warning unit for transmitting a warning to the pilot if a difference between the first and second indications is detected, so as to notify the pilot that they have misunderstood the audio message from air traffic control.

7 Claims, 2 Drawing Sheets

(56) References Cited

U.S. PATENT DOCUMENTS

| | | | | |
|---|---|---|---|---|
| 9,190,073 B2* | 11/2015 | Dong | ................... | G10L 15/183 |
| 2008/0045198 A1* | 2/2008 | Bhogal | ............... | G08G 5/0021 |
| | | | | 455/414.4 |
| 2008/0144638 A1* | 6/2008 | Bay | ................... | H04B 7/18506 |
| | | | | 370/428 |
| 2010/0027768 A1* | 2/2010 | Foskett | ............. | H04B 7/18506 |
| | | | | 704/235 |
| 2015/0081292 A1 | 3/2015 | Populus et al. | | |
| 2016/0379640 A1* | 12/2016 | Joshi | ................ | H04B 7/18506 |
| | | | | 704/235 |
| 2018/0096607 A1 | 4/2018 | Cotdeloup et al. | | |

* cited by examiner

METHOD AND DEVICE FOR AUTOMATICALLY MANAGING AUDIO AIR TRAFFIC CONTROL MESSAGES ON BOARD AN AIRCRAFT

CROSS-REFERENCES TO RELATED APPLICATIONS

This application claims the benefit of French patent application No. 1905405 filed on May 23, 2019, the entire disclosures of which are incorporated herein by way of reference.

FIELD OF THE INVENTION

The present invention relates to a method and to a device for automatically managing audio air traffic control messages on board an aircraft.

BACKGROUND OF THE INVENTION

The present invention relates to the audio communication between the Air Traffic Control (ATC) on the ground and an aircraft, in particular a transport airplane, and, more specifically, to the management of audio air traffic control messages transmitted by a ground-based transmitter from an air traffic controller and received on board the aircraft by means of at least one radio communication unit. An audio air traffic control message generally comprises instructions that must be executed on the aircraft and/or information that must be sent to a pilot of the aircraft.

From the Applicant's patent application FR 3010809, a method is known for automatically managing such audio air traffic control messages on board an aircraft. This method comprises a first step of transcribing the audio message into a text message, a second step of verifying whether the message is intended for the aircraft, then, if the message is intended for the aircraft, a third step of extracting indications (instructions or information) contained in the message, and a fourth step of displaying the indications for the attention of the pilot.

Thus, the audio air traffic control messages are automatically managed and, for each of the indications (instructions or information) contained in a given audio message, a corresponding information message is displayed on a screen of the cockpit in order to notify the pilot, which allows the pilot to be relieved of many routine tasks and their workload to be reduced.

This method thus assists the pilot during the reception of an audio message.

Following the reception of the audio message, the pilot is supposed to restate it by sending an audio message to the air traffic control, in which message they repeat the indications contained in the audio message received from the air traffic control. Thus, if the pilot has misunderstood some information, the air traffic controller can detect this and notify the pilot.

However, in some circumstances, the air traffic controller may not detect that the pilot has misunderstood the audio message.

SUMMARY OF THE INVENTION

The aim of the present invention is to overcome this disadvantage. It relates to a method for automatically managing audio air traffic control messages on board an aircraft, which messages are transmitted by a transmitter from an air traffic controller and are received on board the aircraft by means of at least one radio communication unit, the method comprising a first phase comprising at least the following steps, which are automatically and successively implemented when an audio message is received on board the aircraft by the radio communication unit:

a first transcription step, implemented by a first transcription unit, involving transcribing this received audio message into a text message; and a first processing step, implemented by a first processing unit, involving processing the text message so as to extract indications, called first indications, from the text message.

In general, an audio message from the air traffic control comprises instructions that must be executed on the aircraft and/or information that must be sent to a pilot of the aircraft. Within the scope of the present invention, an "indication" refers to such an instruction or to such information.

According to the invention, the method further comprises a second phase implemented after the first phase during the transmission of an audio message, called restated audio message, transmitted by the pilot to the air traffic control after the reception of the audio message, this second phase comprising at least the following steps, which are implemented automatically and successively:

a second transcription step, implemented by a second transcription unit, involving transcribing the restated audio message into a text message, called restated text message;

a second processing step, implemented by a second processing unit, involving processing the restated text message so as to extract indications, called second indications, from the restated text message;

a comparison step, implemented by a comparison unit, involving comparing at least part of the second indications with at least part of the first indications so as to be able to detect, if applicable, at least one difference between the first and second indications; and a warning step, implemented by a warning unit, involving transmitting a warning to the pilot if at least one difference between the first and second indications is detected in the comparison step.

Thus, by virtue of the invention, it is possible to automatically notify the pilot when, following the reception of an audio message from the air traffic control, with a view to repeating the received message, they have transmitted an audio message (called restated audio message) that does not correspond to the audio message received from the air traffic control. Consequently, the pilot is notified of a lack of correspondence between the initial audio message from the air traffic control and their restated audio message, and this occurs even if the air traffic control does not detect this lack of correspondence. It is thus possible to overcome the aforementioned disadvantage.

In a first embodiment, the first processing step also involves extracting from the text message an identifier (or indicator) of the aircraft that is the recipient of the audio message, the first phase comprises an additional comparison step, implemented by an additional comparison unit, involving comparing the extracted identifier with an identifier of the aircraft on board which the method is implemented, and the second phase is only implemented if the two identifiers are identical.

Furthermore, in a second embodiment, the first processing step also involves extracting from the text message an identifier (or indicator) of the aircraft that is the recipient of the audio message, the first phase comprises an additional comparison step, implemented by an additional comparison unit, involving comparing the extracted identifier with an identifier of the aircraft on board which the method is implemented, and the second phase is only implemented if one of the following two situations occurs:

- a first situation, when the two identifiers are identical (as in the aforementioned first embodiment);
- a second situation, when the two identifiers are different but the pilot has sent a restated audio message to the air traffic control within a time period that is less than a predefined duration following the reception of the audio message originating from the air traffic control.

In this second embodiment, in the second situation, if the second indications contained in the restated audio message transmitted by the pilot at least partly correspond to the first indications contained in the audio message received from the air traffic control, the warning step transmits a warning to the pilot to alert them of the fact that they are not the recipient of the audio message.

Furthermore, advantageously, the warning step involves displaying an indication allowing the pilot to identify the one or more differences between the first and second compared indications.

The present invention also relates to a device for automatically managing audio air traffic control messages on board an aircraft, which messages are transmitted by a transmitter from an air traffic controller and are received on board the aircraft by means of a radio communication unit, the automatic management device comprising at least:

- a first transcription unit configured to transcribe the received audio message into a text message; and
- a first processing unit configured to process the text message so as to extract indications, called first indications, from the text message.

According to the invention, the automatic management device further comprises:

- a second transcription unit configured to transcribe an audio message, called restated audio message, transmitted by the pilot to the air traffic control into a text message, called restated message, after the reception of the audio message;
- a second processing unit configured to process the restated text message so as to extract indications, called second indications, from the restated text message;
- a comparison unit configured to compare at least part of the second indications with at least part of the first indications so as to be able to detect, if applicable, at least one difference between the first and second indications; and
- a warning unit configured to transmit a warning to the pilot if at least one difference between the first and second indications is detected by the comparison unit.

Advantageously, the first processing unit is also configured to extract from the text message an identifier of the aircraft that is the recipient of the audio message, and the device comprises an additional comparison unit configured to compare the extracted identifier with an identifier of the aircraft provided with the device.

In a preferred embodiment, the warning unit comprises a display unit configured to display at least one indication allowing the pilot to identify, if applicable, the one or more differences between the first and second indications.

Furthermore, advantageously, the first and second transcription units correspond to the one and the same transcription unit, and the first and second processing units correspond to the one and the same processing unit.

The present invention further relates to an aircraft, in particular a transport airplane, that is equipped with an automatic management device as described above.

BRIEF DESCRIPTION OF THE DRAWINGS

The accompanying figures will clearly demonstrate how the invention can be implemented. In these figures, identical reference signs denote similar elements.

DETAILED DESCRIPTION OF THE PREFERRED EMBODIMENTS

Figure 1:
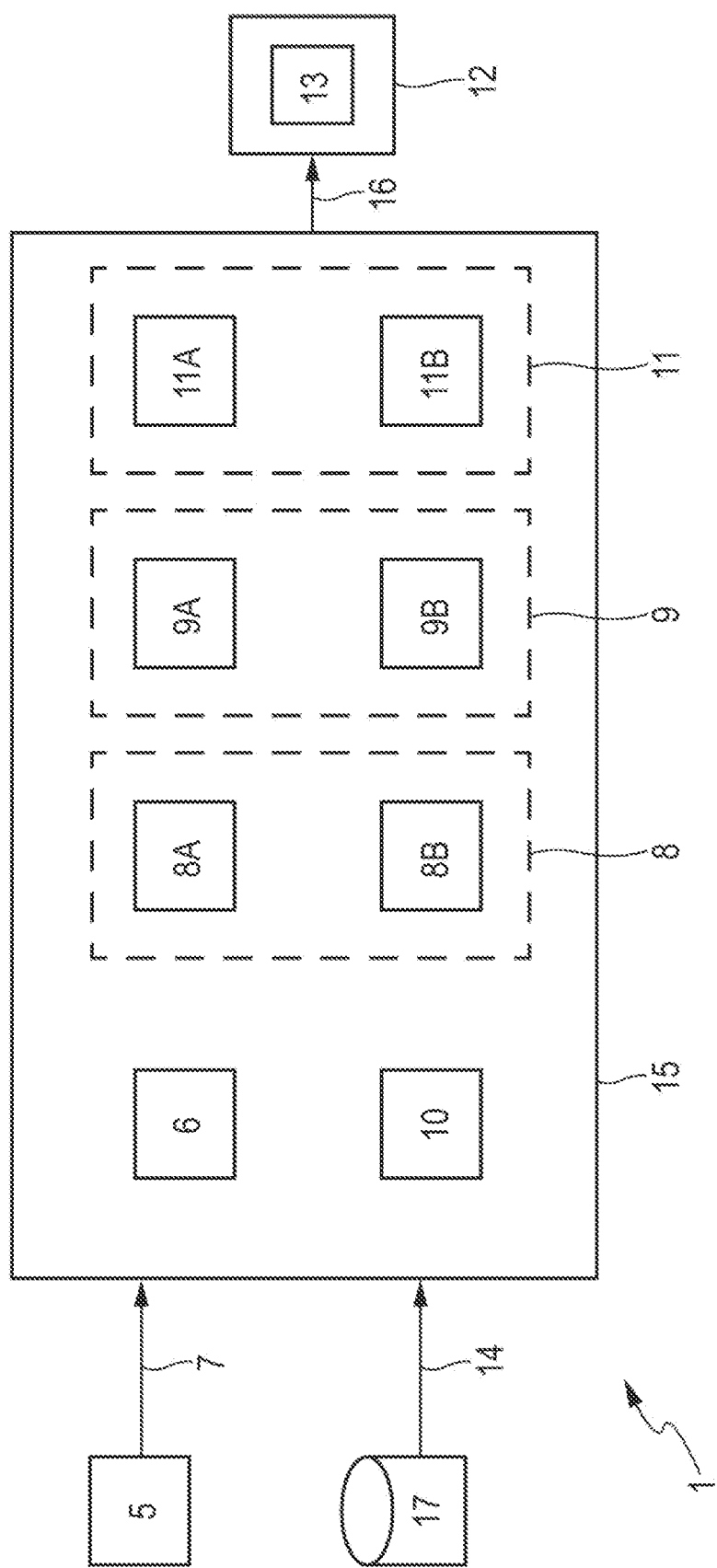
FIG. 1 is the block diagram of a particular embodiment of a device for automatically managing audio air traffic control messages.

The device 1 illustrating the invention and schematically shown in FIG. 1 is a device for automatically managing audio ATC (Air Traffic Control) type messages on board an aircraft AC (FIG. 2), in particular a transport airplane.

Figure 2:
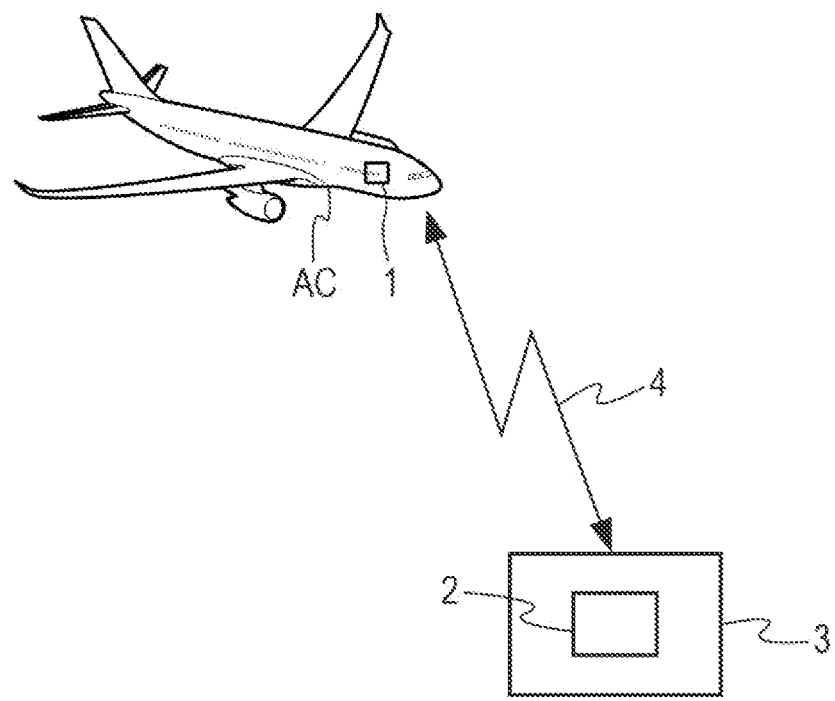
FIG. 2 schematically shows a perspective view of an aircraft provided with such an automatic management device, to which the present invention can be applied.
Figure 3:
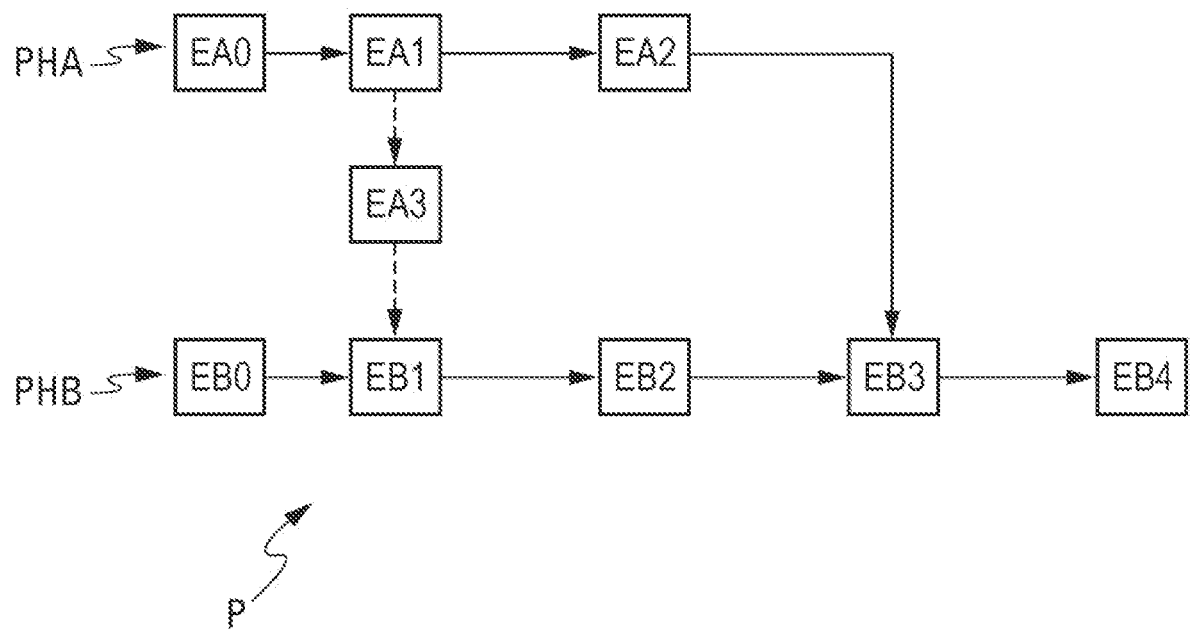
FIG. 3 schematically shows the steps of an automatic management method implemented by the automatic management device of FIG. 1.

Conventionally, as is schematically shown in FIG. 2, the audio air traffic control messages are generated and transmitted at a particular transmission frequency by a transmitter 2 from an air traffic control station 3 installed on the ground. These messages are transmitted via electromagnetic waves, as shown by an arrow 4 in FIG. 2, and are received on board the aircraft AC by means of a conventional radio communication unit 5 (or radio) (FIG. 1) set to this transmission frequency.

By way of an example, the ground-based air traffic control can address an aircraft AC identified by an identifier (or indicator) that is "E123", via the following audio message: "E123, climb to flight level 150".

An ATC message generally comprises:

- a first compulsory indicator (or identifier) ("E123") denoting the aircraft AC for which the indications contained in the ATC message are intended;
- a second indicator (or identifier) relating to the source of the ATC message, which is optional; and
- a set of indications, with these indications being able to be more or less complex and to contain one (as in the preceding example) or more instructions or information items to be transmitted.

The audio ATC messages do not systematically lead to actions by the one or more pilots to modify flight parameters. They can also comprise messages of an informative nature, questions or messages notifying the crew of a probable change of situation (for example, a change of runway) that potentially could lead to actions to be undertaken.

An audio ATC message therefore comprises instructions that must be executed on the aircraft AC and/or information that must be sent to a pilot of the aircraft AC. Within the scope of the present invention, an "indication" refers to such an instruction or to such information.

The ATC messages are coded and structured according to well defined and regulated phraseology. The audio ATC messages can be sent, either in the language spoken on the ground when the crew of the aircraft speaks this language (for example: "E123, monter au niveau de vol 150" ("E123, climb to flight level 150") sent in France to a French speaking crew), or in English in all other cases.

In order to automatically manage such ATC type audio messages, the device 1 that is on board the aircraft AC comprises, as shown in FIG. 1:
- a reception unit 6 that is connected by means of a connection 7 to the radio communication unit 5 and is configured to automatically acquire any audio message received by the radio communication unit 5;
- a transcription unit 8A that is configured to automatically, conventionally transcribe, in real time, an audio message acquired by the reception unit 6 into a text message via a "Voice-to-Text" type transcription; and
- a (data) processing unit 9A that is configured to process the text message transmitted by the transcription unit 8A and corresponds to a received audio message, so as to particularly extract at least part of and preferably all the indications, called first indications, contained in the message.

Following the reception of the audio message, the pilot must restate the message by sending an audio message (called restated audio message) to the air traffic control via the radio communication unit 5, in which message they repeat the indications contained in the audio ATC message received from the air traffic control. By way of an example, after reception of the aforementioned audio message (namely "E123, climb to flight level 150"), the pilot, in response, must confirm the reception of this audio message with the following restated audio message: "climb to flight level 150, E123".

In order to verify the coherence of this restated (or confirmation) audio message, i.e., to verify whether it actually corresponds to the audio ATC message transmitted by the air traffic control, the device 1 comprises an acquisition unit 10 that is configured to acquire the restated audio message (conventionally) transmitted by the pilot to the traffic control.

According to the invention, in order to verify the coherence, the device 1 further comprises, as shown in FIG. 1:
- a transcription unit 8B that is configured to automatically, conventionally transcribe, in real time, the restated audio message transmitted by the pilot to the air traffic control and acquired by the acquisition unit 10 into a text message via a "Voice-to-Text" type transcription;
- a processing unit 9B that is configured to process the restated text message transmitted by the transcription unit 8B so as to particularly extract at least part of and preferably all the indications, called second indications, contained in the message;
- a comparison unit 11B configured to compare at least part of the second indications received from the processing unit 9B with at least part of the first indications received from the processing unit 9A so as to be able to detect, if applicable, at least one difference between the first and second received indications; and
- a warning unit 12 configured to transmit a warning to the pilot if a difference between the first and second indications is detected by the comparison unit 11B.

The warning unit 12 can be configured to generate a visible warning and/or an audible warning in the cockpit of the aircraft AC.

In a preferred embodiment, the warning unit 12 comprises a display unit 13 that is configured to display at least one indication allowing the pilot to identify, if applicable, the one or more differences detected between the first and second indications.

Consequently, the device 1 as described above automatically notifies the pilot via the warning unit 12 when, after the reception of an audio ATC message, they have repeated the message in the form of a restated audio message that does not correspond to the audio ATC message. Thus, the pilot is notified of the lack of correspondence between the two audio messages, i.e., they have misunderstood and/or incorrectly restated the audio ATC message.

The transcription units 8A and 8B can be different units. Similarly, the processing units 9A and 9B can be different units.

However, in a preferred embodiment, the transcription units 8A and 8B correspond to the one and the same transcription unit 8, as shown by the dashed lines in FIG. 1, and the processing units 9A and 9B correspond to the one and the same processing unit 9, as also shown by the dashed lines in FIG. 1.

In a preferred embodiment, the reception unit 6, the one or more transcription units 8A and 8B, the one or more processing units 9A and 9B, the acquisition unit 10 and the comparison unit 11B form part of a central unit 15, which is, for example, connected by means of connections 7 and 16, respectively, to the radio communication unit 5 and to the warning unit 13.

Within the scope of the present invention, the one or more processing units 9A, 9B can implement different processing modes for processing the text message in order to be able to extract the desired data therefrom.

In particular, in a first embodiment, the one or more processing units 9A, 9B are configured to analyze the text message (generated by the one or more transcription units 8A, 8B and recorded), firstly through a lexical analysis, then through a syntactic analysis and, finally, advantageously, through a semantic analysis, so as to extract the indications contained in the text message.

The indications of the ATC messages are coded using a particular phraseology in order to be understood by the pilots and to be unambiguous and to thus ensure exchanges that guarantee flight safety. A lexicon illustrating this phraseology is recorded in a database 17 (connected by means of a connection 14 to the central unit 15), and the processing unit 9 or the processing units 9A and 9B (of the central unit 15) can thus determine the keywords contained in an ATC message received on board the aircraft AC. A structure for the instructions defined by this phraseology is also recorded in the database 17 and allows the processing unit 9 or the processing units 9A and 9B to determine the groups of words associated with a given instruction. It is thus possible to identify the different instructions contained in a message and to interpret each of these instructions with the connections between them.

Conventionally, a lexical analysis involves dividing a sequence of characters into lexical units or entities (called "tokens"). These lexical tokens are subsequently processed by the syntactic analysis. The lexical analysis uses elements contained in the database 17 to type the words. This analysis is implemented word-by-word and associates a type with each word (keyword associated with a given category, variable value of a given type (for example, the time), free text, etc.). In particular, a silence is analyzed as a word with a particular type allowing the analysis of the structure of the message to be facilitated during the syntactic analysis.

The syntactic analysis involves highlighting the structure of a text. The syntactic analyzer ("parser") is the computer program that performs this task. In a particular approach, this operation assumes a wording of the text that is most often viewed as an element of a formal language, defined by a set of syntax rules forming formal grammar. The structure revealed by the syntactic analysis then precisely provides the manner by which the syntax rules are combined in the text. The syntactic analysis uses information contained in the database 17 defining the grammar (structure of the overall text and of each category).

Furthermore, in a second embodiment, the one or more processing units 9A, 9B are configured to implement each of the considered analyses (lexical analysis, syntactic analysis and semantic analysis) using models obtained by machine learning, for example, in the form of neural networks or of conditional random fields. These models particularly can be recorded in the database 17 or in a dedicated database (not shown).

Furthermore, in a third embodiment, the one or more processing units 9A, 9B are configured to, during the processing of the text message, implement the entire analytical sequence using a model obtained by machine learning, for example, in the form of neural networks or of conditional random fields. This model particularly can be recorded in the database 17 or in a dedicated database (not shown).

In a preferred embodiment, the processing unit 8A is also configured to extract, from the text message (corresponding to the audio ATC message), a sequence of characters representing the identifier (or indicator) denoting the aircraft that is the recipient of this audio ATC message. Furthermore, the device 1 comprises a comparison unit 11A, called additional unit, that is configured to compare the extracted identifier with an identifier of the aircraft AC provided with the device 1 (FIG. 2).

Preferably, the comparison unit 11A forms part of the central unit 15, as shown in FIG. 1.

Furthermore, the comparison units 11A and 11B can be different units. However, in a preferred embodiment, the comparison units 11A and 11B correspond to the one and the same comparison unit 11, as shown by the dashed lines in FIG. 1.

Through this comparison, the comparison unit 11A is able to determine that the audio message is intended for the aircraft AC, when the two identifiers (or indicators) are identical.

The units 8B, 9B and 11A implement the aforementioned processes only if the two identifiers are identical, and they therefore do not implement them if the two identifiers are different, i.e. if the audio ATC message is intended for an aircraft other than the aircraft AC (equipped with the device 1).

Furthermore, in this case, if, despite the fact that the two identifiers are different, the pilot has nevertheless sent a restated audio message to the air traffic control, and has done so within a time period that is below a predefined duration (for example, 5 seconds) after the reception of the audio ATC message, the units 8B, 9B and 11A implement the aforementioned processes.

In this latter situation, if the indications contained in the restated audio message transmitted by the pilot at least partly correspond to the indications contained in the audio ATC message received from the air traffic control, the warning unit 12 transmits a warning to the pilot to alert them of the fact that they are not the recipient of the audio ATC message (that they at least partly restated).

The device 1, as described above, is able to implement a method P for automatically managing audio ATC messages. This method P comprises a first phase PHA comprising at least the following steps, which are automatically and successively implemented when an audio ATC message is received on board the aircraft AC:

a transcription step EA1, implemented by the transcription unit 8A, involving transcribing this received audio message into a text message; and a processing step EA2, implemented by the processing unit 9A, involving processing the text message so as to extract indications, called first indications, from the text message.

The method P also comprises a reception step EA0, implemented by the reception unit 6 after the transcription step EA1, involving automatically acquiring any audio message received by the radio communication unit 5, which message will be subsequently taken into account in the transcription step EA1.

According to the invention, the method P also comprises a second phase PHB implemented after the first phase PHA, during the transmission of a restated audio message in response to the audio ATC message. This second phase PHB comprises at least the following steps, which are implemented automatically and successively:

a transcription step EB1, implemented by the transcription unit 8B, involving transcribing the restated audio message into a restated text message;

a processing step EB2, implemented by the processing unit 9B, involving processing the restated text message so as to extract indications, called second indications, from the restated text message;

a comparison step EB3, implemented by the comparison unit 11B, involving comparing at least part of the second indications (extracted during the processing step EB2) with at least part of the first indications (extracted during the processing step EA2) so as to be able to detect, if applicable, at least one difference between the first and second indications; and a warning step EB4, implemented by the warning unit 12, involving transmitting a warning to the pilot if a difference between the first and second indications is detected in the comparison step EB3.

The method P also comprises an acquisition step EB0, implemented by the acquisition unit 10 in the phase PHB after the transcription step EB1, involving automatically acquiring any restated audio message (conventionally) transmitted by the pilot to the air traffic control, which message will be subsequently taken into account in the transcription step EB1.

In a first embodiment, the processing step EA1 also involves extracting from the text message an identifier of the aircraft that is the recipient of the audio message, the first phase PHA comprises an additional comparison step EA3, implemented by the additional comparison unit 11A, involving comparing the extracted identifier with an identifier of the aircraft AC, and the second phase PHB is only implemented if the two identifiers are identical.

Furthermore, in a second embodiment, the processing step EA1 also involves extracting from the text message an identifier of the aircraft that is the recipient of the audio ATC message, the first phase PHA comprises the additional comparison step EA3, implemented by the additional comparison unit 11B, involving comparing the extracted identifier with an identifier of the aircraft on board which the method is implemented, and the second phase PHB is only implemented if one of the following two situations occurs:

a first situation, when the two identifiers are identical (as in the first aforementioned embodiment);

a second situation, when the two identifiers are different but the pilot has sent a message to the air traffic control within a time period that is less than a predefined duration following the reception of the audio ATC message originating from the air traffic control.

In this second embodiment, in the second situation, if the second indications contained in the restated audio message transmitted by the pilot at least partly correspond to the first indications contained in the audio message received from the air traffic control, the warning step EB4 transmits a warning to the pilot to alert them of the fact that they are not the recipient of the audio message.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for automatically managing audio air traffic control messages on board an aircraft, which messages are transmitted by a transmitter from an air traffic controller and are received on board the aircraft by means of at least one radio communication unit, said method comprising:
   a first phase comprising at least the following steps, which are automatically and successively implemented when a first audio message is received on board the aircraft by the radio communication unit:
      transcribing the received first audio message into a text message in a first transcription step, implemented by a first transcription unit; and
      processing said text message so as to extract indications, called first indications, from said text message in a first processing step, implemented by a first processing unit;
   a second phase implemented after said first phase during the transmission of a second audio message, called restated audio message, transmitted by a pilot to the air traffic controller after reception of said first audio message, the second phase comprising at least the following steps, which are implemented automatically and successively:
      transcribing the restated audio message into a text message, called restated text message in a second transcription step, implemented by a second transcription unit;
      processing said restated text message so as to extract indications, called second indications, from said restated text message in a second processing step, implemented by a second processing unit;
      comparing at least part of said second indications with at least part of said first indications so as to be able to detect, if applicable, at least one difference between said first and second indications in a comparison step, implemented by a comparison unit; and
      transmitting a warning to the pilot if at least one difference between said first and second indications is detected in the comparison step in a warning step, implemented by a warning unit,
   wherein the first processing step also involves extracting from said text message a first identifier of the aircraft that receives the first audio message,
   wherein said first phase comprises an additional comparison step, implemented by an additional comparison unit, involving comparing said first identifier with a second identifier of the aircraft on board which said method is implemented, and
   wherein said second phase is only implemented if one of the following two situations occurs:
      a first situation, when the first and second identifiers are identical;
      a second situation, when the first and second identifiers are different but the pilot has sent a restated audio message to the air traffic control within a time period that is less than a predefined duration following the reception of the first audio message originating from the air traffic control; and
   wherein, in the second situation, if the second indications contained in the restated audio message transmitted by the pilot at least partly correspond to the first indications contained in the first audio message received from the air traffic control, the warning step transmits a warning to the pilot to alert them that they are not the recipient of the audio message.

2. The method as claimed in claim 1, wherein said second phase is only implemented if the two identifiers are identical.

3. The method as claimed in claim 1, wherein the warning step involves displaying an indication allowing the pilot to identify the at least one difference between the first and second compared indications.

4. A device for automatically managing audio air traffic control messages on board an aircraft, which messages are transmitted by a transmitter from an air traffic controller and are received on board the aircraft by means of a radio communication unit, said device comprising:
   a first transcription unit configured to transcribe a first received audio message into a text message; and
   a first processing unit configured to process said text message so as to extract indications, called first indications, from said text message, wherein the first processing unit is also configured to extract from said text message a first identifier of the aircraft that receives the first audio message;
   a second transcription unit configured to transcribe a second audio message, called restated audio message, transmitted by the pilot to the air traffic control into a text message, called restated message, after the reception of said first received audio message;
   a second processing unit configured to process said restated text message so as to extract indications, called second indications, from said restated text message;
   a comparison unit configured to compare at least part of said second indications with at least part of said first indications so as to be able to detect, if applicable, at least one difference between said first and second indications;
   a warning unit configured to transmit a warning to the pilot if at least one difference between said first and second indications is detected by the comparison unit;
   an additional comparison unit configured to compare said extracted identifier with a second identifier of the aircraft which includes the device, and
   wherein said second transcription unit is only configured to transcribe the restated audio message only if one of the following two situations occurs:

a first situation, when the first and second identifiers are identical;

a second situation, when the first and second identifiers are different but the pilot has sent a restated audio message to the air traffic control within a time period that is less than a predefined duration following the reception of the first audio message originating from the air traffic control; and wherein, if the second indications contained in the restated audio message transmitted by the pilot at least partly correspond to the first indications contained in the first audio message received from the air traffic control, the warning unit is configured to transmit a warning to the pilot to alert them that they are not the recipient of the audio message.

5. The device as claimed in claim 4, wherein the warning unit comprises a display unit configured to display at least one indication allowing the pilot to identify, if applicable, the at least one difference between the first and second indications.

6. The device as claimed in claim 4, wherein said first and second transcription units correspond to the one and the same transcription unit, and wherein said first and second processing units correspond to the one and the same processing unit.

7. An aircraft, comprising a device as specified in claim 4.

* * * * *